US006659351B1

(12) United States Patent
Bailleu et al.

(10) Patent No.: US 6,659,351 B1
(45) Date of Patent: Dec. 9, 2003

(54) ELECTRIC EFFECT-BASED SECURITY FEATURE ON SECURITY DOCUMENTS AND ON DOCUMENTS OF VALUE-PROOF PROCESS BELONGING THERETO

(75) Inventors: Anett Bailleu, Berlin (DE); Frank Kappe, Rheda-Wiedenbrück (DE)

(73) Assignee: Bundesdruckerei GmbH, Berlin (DE)

( * ) Notice: Subject to any disclaimer, the term of this patent is extended or adjusted under 35 U.S.C. 154(b) by 0 days.

(21) Appl. No.: 09/586,639

(22) Filed: Jun. 5, 2000

(30) Foreign Application Priority Data

Jun. 8, 1999 (DE) .......................................... 199 26 010

(51) Int. Cl.[7] ................................................ G06K 19/00
(52) U.S. Cl. ........................................ 235/487; 235/381
(58) Field of Search ................................. 235/449, 380, 235/382, 382.5, 494; 233/70, 74, 83

(56) References Cited

U.S. PATENT DOCUMENTS

| | | | | | |
|---|---|---|---|---|---|
| 4,025,759 | A | * | 5/1977 | Scheffel | 235/380 |
| 4,394,773 | A | | 7/1983 | Ruell | 382/4 |
| 4,763,927 | A | * | 8/1988 | Schneider | 283/70 |
| 4,792,667 | A | | 12/1988 | Chen | 235/488 |
| 5,145,518 | A | * | 9/1992 | Winnik et al. | 106/31.15 |
| 5,209,515 | A | * | 5/1993 | Dotson et al. | 283/95 |
| 5,614,824 | A | * | 3/1997 | Dames et al. | 324/239 |
| 5,743,615 | A | * | 4/1998 | McIntyre et al. | 353/122 |
| 5,792,725 | A | * | 8/1998 | Simpson et al. | 503/227 |
| 6,221,296 | B1 | * | 4/2001 | James et al. | 264/153 |
| 6,246,224 | B1 | * | 6/2001 | Brown | 324/109 |
| 6,336,716 | B1 | * | 1/2002 | Sakamaki et al. | 347/68 |
| 6,496,251 | B1 | * | 12/2002 | Wunderer | 356/71 |

FOREIGN PATENT DOCUMENTS

| | | | | |
|---|---|---|---|---|
| DE | 40 18 772 | | | 12/1991 |
| DE | 198 27 448 | | | 1/1999 |
| EP | 0 044 489 | | | 1/1982 |
| EP | 1 059 620 | A1 | * | 5/2000 |
| FR | 2478695 | A | * | 9/1981 |
| FR | 0026938390 | A1 | * | 5/1994 |
| GB | 2332645 | A | * | 6/1999 |
| WO | WO 97/07478 | | | 2/1997 |
| WO | WO 99/01292 | | * | 1/1999 |

OTHER PUBLICATIONS

German Search Report dated Mar. 2, 2000, 199 26 010.9.

* cited by examiner

*Primary Examiner*—Thien M. Le
(74) *Attorney, Agent, or Firm*—Baker & Daniels

(57) ABSTRACT

A security feature is provided for value and security documents in the form of piezo security particles. Electrical and mechanical properties of the piezo-security particles are utilized to detect and evaluate the security feature of the value and security document.

13 Claims, 2 Drawing Sheets

ELECTRIC EFFECT-BASED SECURITY FEATURE ON SECURITY DOCUMENTS AND ON DOCUMENTS OF VALUE-PROOF PROCESS BELONGING THERETO

BACKGROUND OF THE INVENTION

1. Field of the Invention

The object of the invention is a security feature and a corresponding proof process for security documents, which process is based on the piezo effect.

2. Description of the Related Art

Hitherto there has been merely known the practice of applying the security features to security documents and documents of value in the form of particles, these particles having been formed as electro-luminescence elements. Such electro-luminescence elements react in an electromagnetic alternating field, as they emit a given light. A precondition for this security feature, to be sure, is the applying of an external electromagnetic field, which is associated with relatively high expenditures. Furthermore, the application range of these security and value documents provided with EL particles is restricted to the condition that only a light of a given wavelength is emitted.

Underlying the invention, therefore, is the problem of further developing security and value documents of the type mentioned at the outset in such manner that a further security feature can be added. The use purpose of such a document is therewith to be extended. Besides the optical detection of security features there is further to be made possible a detection in another frequency range. An additional feature of the present invention lies in that a process is described for the detection of this security characteristic.

BRIEF SUMMARY OF THE INVENTION

The solution of the first problem occurs essentially through the feature that the value and security document is equipped with piezo-electric properties.

The solution of the second problem occurs essentially by the means that the value and security document is exposed to the signals, in which the piezoelectric properties are utilized. The signals given off from the piezo elements are thereupon detected and evaluated.

In a preferred embodiment of the invention it is provided that the piezoelectric properties of this value and security documents were introduced onto or into the document in the form of piezo material.

If value and security documents or other relevant products are equipped with piezoelectric security features, then these can be mechanically excited (for example by impacts or acoustically) or optionally electrically, and their answers can be detected and evaluated. From the system answer of the value and security document it is possible to infer the materials used and their geometrical dimensions. A comparison of test piece and reference sample makes possible a distinguishing of genuine and forged value papers or products.

The equipping of relevant products with piezoelectric security features can occur in the following manners:

- piezoelectric micron particles are admixed to the printing inks or other application layers,
- piezoelectric micron particles are admixed to the base material of the security product (for example paper, foils, glass) during the production,
- metallized piezo-polymer foils in the micron range are applied as intermediate product and/or layer in or onto the value paper/product (gluing, laminating, laser welding etc.), or
- piezo ceramic platelets are laminated in with thicknesses of much less than 100 microns.

As micron particles there are designated elements the geometric dimensions of which lie in the range of microns.

Excited with impulses, the piezo elements react with vibrations which again are electrically or mechanically (acoustically) transferred and can be suitably evaluated. Especially the natural frequencies of these vibrations are a highly significant characteristic for types of materials used and their geometric dimensions. As additional information parameters there can be evaluated the signal damping (FFT) of a transmitted signal.

In the invention therefore both the piezo effect and also the reciprocal piezo effect is drawn upon for the evaluation.

Thus there is obtained with the frequency spectrum according to reception signal scanning and FFT, a sort of "Fingerprint" of the value paper or product.

In a preferred embodiment of the present invention there is provided that in such a value and security document there are embedded piezo-electrically active particles. Here it is not a matter of the grain size and the type and the arrangement of these particles in detail. They can be either uniformly embedded into the material of the value and security document, in which case, however, they could be heaped up in certain places of the value and security document.

In another embodiment they can be applied to the surface of the value and security document, (and be embedded into the document on the surface, or they can additionally be covered by means of a covering layer, a lacquering, a plastic covering or a lamination foil.

In a further embodiment of the invention it can be provided that instead of using individual particle-form piezo materials, a piezo effect may also be produced in a polymer foil.

As an example for such a polymer foil there is to be mentioned a PVDF foil.

Instead of the use of individual piezo particles that are applied in uniform or non-uniform form to or on a value or security document it is possible in another embodiment to sinter such elements, especially in crystal structure, in order to create from them a larger piezo element. Also such a larger piezo element can be embedded—as stated earlier—either on the surface or at the surface of the value and security document or also embedded in the surface.

What is important in the invention is that to the first mentioned security feature known per se, i.e. the emitting of a certain light spectrum, there is now allocated a further security feature which can act standing alone or in connection with other security features. In the corresponding excitation of the piezo material mentioned, therefore, a vibration answer is generated to a corresponding mechanical or acoustical excitation of the piezo material.

On mechanical loading of certain crystals, such as, for example, quartz, tourmaline, Seignette salt in given directions to the crystal axes there occur, namely, electrical displacements, consequently free surface charges, which are proportional to the generating force. This piezoelectric effect is suited as the basis for the security feature described here. The preferably used quartz crystallizes in hexagonal prisms. Correspondingly to its atomic structure it has 3 polar electric axes, 3 mechanical neutral axes and one optical axis standing perpendicularly to these. From the crystal then, parallel plates are cut out, which are suitable as feelers.

If these are pressed in X- or Y-direction, then there arises on the X–Z surfaces the charging of the piezo module.

The invention is not restricted, however, to the use of mono-crystalline crystals, but—as indicated earlier—crystal agglomerates can be used, or also sintered crystals.

Instead of such crystals ceramic bodies can also be used, which are likewise known to have a piezoelectric effect.

The excitation of such a piezo material occurs preferably with an acoustic or electric impulse. Likewise the excitation can occur with a signal source in which all the frequencies are present, which, therefore generates a wide-band, white noise.

Instead of these excitation mechanisms the excitation can also occur by means of a laser impulse.

The vibration answer of the piezo material occurs in the sense of a natural frequency of this material. If, therefore, excitation is performed with a single impulse, this piezo material is excited up to free-running vibration and it vibrates over a certain impulse duration with a natural frequency which can be detected and evaluated outside of the security and value document. The frequency of the vibration answer lies here in the kilohertz up into the gigahertz range and can be picked up and evaluated with corresponding measurement value receivers.

Preferably, therefore, for the vibration stimulation a single impulse generator is used, which, therefore, mechanically delivers a single impulse onto the value and security document to be tested and with corresponding measurement value receiver technique, then, the vibration answer is detected and evaluated.

Here it is important that always the total system of the value and security document is checked. If, therefore, for example adhesive additives, material denudation fragments or other (also local) attacks were made on the document, then therewith (also locally limitedly) the system-answer of the total system is displaced.

In another embodiment a continuous excitation can occur by means of a white noise which is delivered to the value and security document over a corresponding vibration generator.

Likewise the excitation of the value and security document can occur in feedback operation, i.e. a certain excitation frequency is used; the answer frequency is then investigated and fed back onto the excitation frequency, in order in this way to obtain a vibration excitation and to excite the piezo material in the range of its resonance frequency.

The type of resonance frequency is then an image of the vibration property of the piezo material, and is therewith characteristic as a fingerprint for the security feature which is accommodated in the security document. It is a matter here of a peak pattern which is generated not at a single characteristic frequency, but in a certain frequency band.

The resonance frequency is dependent on the geometry of the individual piezo grain. The effects described earlier obviously serve in a like manner for the piezo electric foil already described, the PVDF foil which is excited in the same manner and that generates a corresponding vibration answer.

BRIEF DESCRIPTION OF THE SEVERAL VIEWS OF THE DRAWINGS

All the indications and features disclosed in the documents, inclusive of the abstract, especially the spatial design represented in the drawing, are claimed as essential to the invention insofar as they are novel individually or in combination with respect to the state of the art.

In the following the invention is explained in detail with the aid of drawings representing only one course of execution. Here there proceed from the drawings and their description further essential features and advantages of the invention.

In the drawing:

Figure 1:
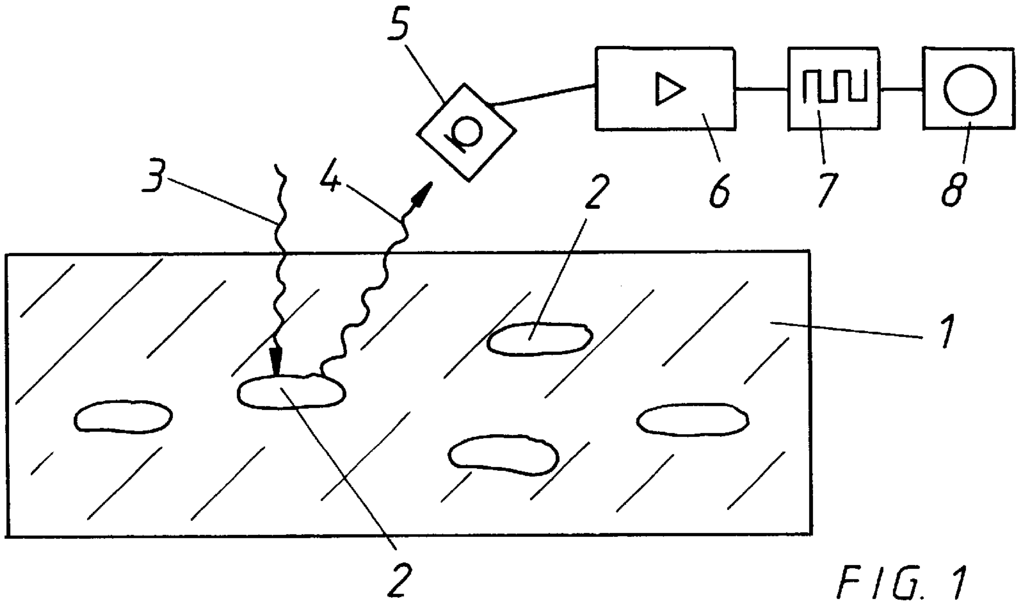
Figure 2:
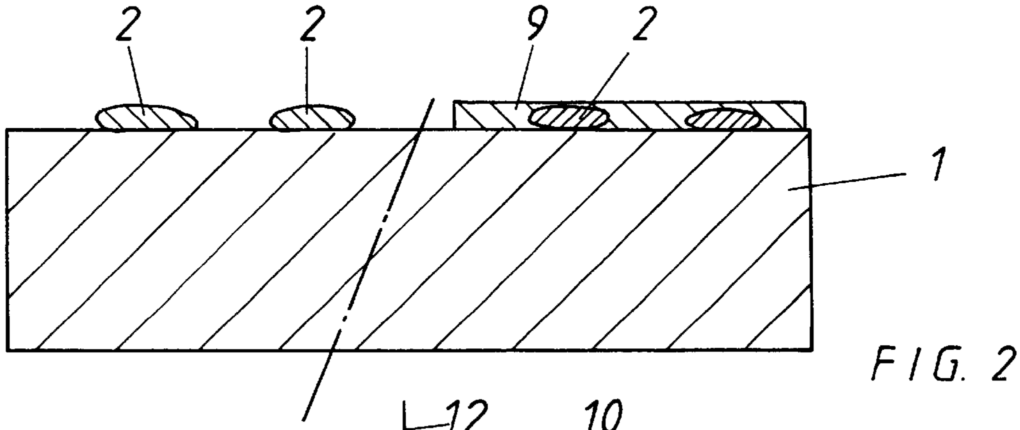
Figure 3:
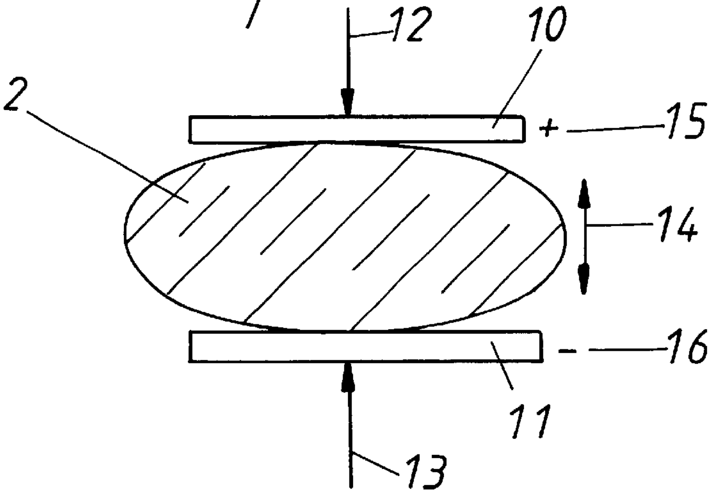
Figure 4:
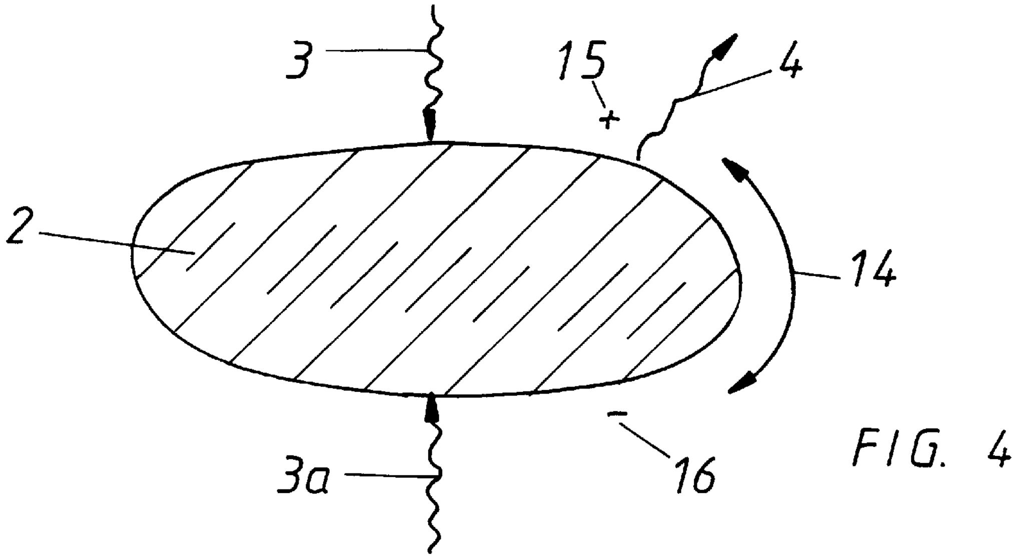
Figure 5:
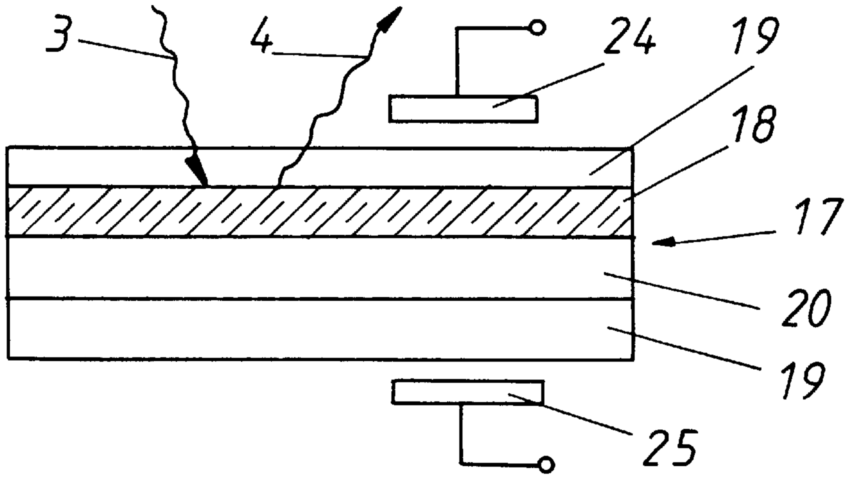
Figure 6:
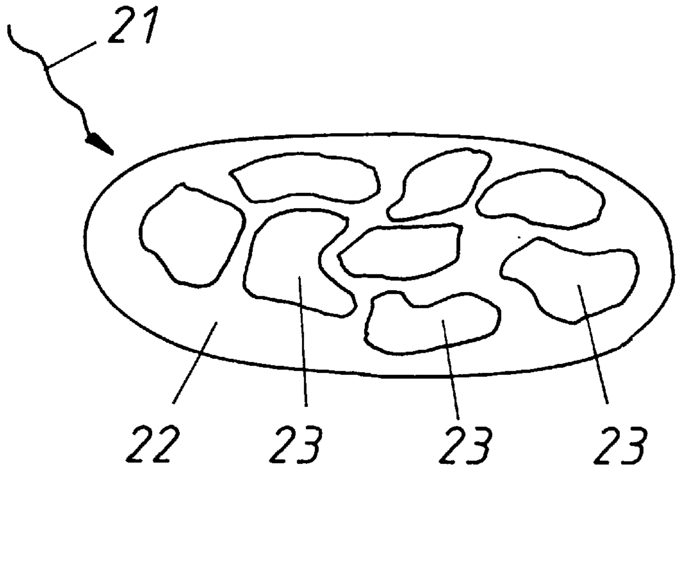

FIG. 1 shows schematically a section through a value document in a first form of execution with representation of the evaluating unit, FIG. 2: two half-sections through a value and security document with two different examples of execution for the application of the piezo material, FIG. 3: the explanation of the mechanical functioning of the piezo material on its excitation, FIG. 4: a form of execution modified with respect to FIG. 3 in which the piezo material is stimulated by means of an impulse, FIG. 5: a section through a value document with piezoelectric properties laminated in card form, FIG. 6: the enlarged section through a piezo element with individual piezo crystals.

DETAILED DESCRIPTION OF THE INVENTION

In FIG. 1 there is represented in general a value document 1, in which a piezo material 2 is embedded. The embedding here can occur in the paper manufacture, so that the piezo material is embedded into the material of the paper in the form of individual granulates, grains, crystal structures and the like.

Obviously the value document 1 does not have to consist of a paper material; it can also be a plastic, a multiply laminated plastic or any arbitrary other material, into which the piezo material is embedded.

It is represented that by means of an excitation 3 the piezo material 2 is acted upon, which then answers with a corresponding vibration answer 4, which is received by a vibration receiver 5.

The vibration receiver 5 can be constructed here as a microphone; i.e., the vibration answer is an acoustic wave which is received by the vibration receiver 5. Consequently, the vibration receiver 5 can itself also be constructed as a crystal or piezo-crystal microphone.

It can, of course, also be emplaced directly on the document, so that depending directly on the value document itself, a further piezo vibration receiver is emplaced, which receives the vibration answer 4 from the piezo material 2 and evaluates it correspondingly. In the example of execution shown, the vibration receiver 5 is connected with an amplifier 6 that for its part is connected with a frequency analyzer 7, which spectrally evaluates the vibration answer 4. The frequency analyzer 7 is then connected with a display device which then generates a true/false announcement.

In FIG. 2 it is represented that the piezo material 2 can also be applied directly to the surface of the value document 1 and can be connected with this value document 1 in arbitrary manner.

The right half-section in FIG. 2 shows that the piezo materials 2 can also be covered with a corresponding coating 9. The coating 9 can be formed here as lacquer, as foil, as printing ink or the like.

They can also protrude in part from the coating 9.

In FIG. 3 there is presented the general principle of the piezo crystal. It is evident that in the mechanical equivalent two printing plates 10, 11 can act from both sides on the piezo material 2 and here one printing force 12, 13 acts in each case on one printing plate 10, 11. Obviously, the invention is not restricted to this; the printing plate 11 and the appertaining printing (or pressure) force 13 can be entirely omitted, because, after all, the applying of a force from above over a corresponding vibration generator fully suffices, since, after all, the piezo material 2 is embedded on a solid or in a solid substrate.

In this equivalent circuit diagram according to FIG. 3 it is supposed to be represented that by reason of the introduction of vibrations the piezo material begins to vibrate in the arrow directions 14 and here there occurs a corresponding surface charging 15, 16, which is always pole-reversed, so that—according to FIG. 4—then by reason of the pole-exchanging surface charges 15, 16 there occurs a vibration emission, i.e., therefore, a vibration answer 4.

This is represented better in FIG. 4, where it is evident that the excitation 3 is applied either as a sole impulse, as excitation by means of a certain excitation frequency (therefore continuous excitation) or as white noise, and here by reason of the pole reversal in the arrow directions 14 the vibration answer 4 is generated.

In FIG. 5 there is presented the technology of a value and security document in the construction as a value card 17.

Such a value card can be a pass card, a personal identification, a driver's license or another security or credit card.

Here it is represented that an upper laminate layer 19 is present, which covers a piezo-electrically active foil (piezo foil 18). This piezo foil is a polymer foil that has piezoelectric properties. If, accordingly, an excitation 3 is initiated onto the piezo foil 18, the latter answers with a vibration answer 4 which can be evaluated correspondingly by an evaluating unit according to FIG. 1.

Besides the evaluation according to an evaluating unit according to FIG. 1, however, the evaluation can also occur by two capacitor plates 24, 25 which take up between them the value card 17. After the vibration answer 4 alters the dielectric between the capacitor plates 24, 25, a corresponding measuring arrangement which measures the impedance between capacitor plates 24, 25 can be drawn upon to evaluate the vibration answer 4.

Obviously it is also possible to pick up the charge displacement which is yielded on the upper side and under side of the piezo foil 18 directly. Here, after all, it is not necessary for the solution that the piezo foil 18 be enclosed in the laminate structure; it can also be present directly on the surface or partly on the surface in order to permit a corresponding contacting.

In the example of execution it is further represented that underneath the piezo foil 18 there can be arranged a substrate layer 20, which again is covered downward by a laminate layer 19.

FIG. 6 shows that also larger piezo elements 21 can be created, which consist of a collection of piezo crystals 23 which, for example, are sintered with one another by a sintering process. It is a matter, therefore, of a piezo crystal.

Likewise the individual piezo crystals 23 can be bound in a carrier substance 22 which is, for example, a plastic.

Besides the excitation by an impulse- or sound-source 3, still other excitation mechanisms can also be used, especially also evaluation mechanisms. It was indicated earlier that the vibration answer 4 is evaluated by corresponding receivers. Instead of the evaluation of the frequency of the vibration answer, however, also the response time can be detected. If, namely, the time point of the vibration excitation is known, there is only needed, still, to measure at which time point the vibration answer 4 is measurable on the measuring value receiver 5, in order in this way to make possible a response time measurement. Instead of the frequency evaluation, therefore, instead of this, a response time measurement can be carried out. With this response time measurement it is further possible, incidentally, to state the exact position (depth of the piezo materials) in the value document to be checked, because, after all, the response time of the vibration answer is a measurement for the depth at which the piezo material 2 is embedded in the document.

After the vibration answer 4 has also been altered by the layers lying above and below in the value document, it is also possible, by the evaluation of the damping of the vibration answer, to infer the materials lying underneath and above.

LEGENDS FOR DRAWINGS

1 Value document
2 Piezo material
3 Excitation 3*a*
4 Vibration answer
5 Vibration receiver
6 Amplifier
7 Frequency analyzer
8 Indicating device
9 Coating
10 Printing plate (or Pressure plate)
11 Printing plate (or Pressure plate)
12 Pressure force
13 Pressure force
14 Arrow direction
15 Surface charge
16 " "
17 Value card
18 Piezo foil
19 Laminate layer
20 Substrate layer
21 Piezo element
22 Carrier substance
23 Piezo crystals
24 Capacitor plate
25 " "

What is claimed is:

1. A value and security document, having particles with piezoelectric properties embedded in and distributed throughout the document.

2. The value and security document of claim 1, further comprising at least one further security feature based on a physical principle other than piezoelectric properties.

3. The value and security document of claim 1, wherein each of said particles is crystalline in structure and includes a plurality of crystals.

4. The value and security document of claim 3, further comprising at least one further security feature based on a physical principle other than piezoelectric properties.

5. The value and security document of claim 1, wherein each of said particles includes a compound of several elements, said elements having at least one of a crystalline structure and a noncrystalline structure.

6. The value and security document of claim 5, further comprising at least one further security feature based on a physical principle other than piezoelectric properties.

7. The value and security document of claim 1, wherein said particles are piezo ceramics.

8. The value and security document of claim 7, further comprising at least one further security feature based on a physical principle other than piezoelectric properties.

9. The value and security document of claim 1, wherein said particles are distributed evenly in the document.

10. A method for examining the authenticity of the value and security document, comprising the steps of:

applying at least one signal to the document to cause piezoelectric particles embedded in and distributed throughout the document to oscillate;

detecting oscillation responses of the particles; and analyzing said responses.

11. The method of claim 10, wherein the step of analyzing said responses includes examining characteristic resonance frequencies of said responses as an image of the oscillation property of the particles to determine authenticity.

12. The method of claim 10, wherein said at least one signal includes a continuous excitation of white noise applied by means of a corresponding oscillation generator.

13. The method of claim 10, wherein said at least one signal includes a feedback component.

* * * * *